United States Patent [19]

Burnett et al.

[11] 4,348,345

[45] Sep. 7, 1982

[54] METHOD FOR THE TAKE-AWAY OF VERTICALLY EXTRUDED SYNTHETIC RESINOUS TUBES

[75] Inventors: Edward L. Burnett; Eugene V. Stack, both of Bay City, Mich.

[73] Assignee: The Dow Chemical Company, Midland, Mich.

[21] Appl. No.: 227,842

[22] Filed: Jan. 23, 1981

[51] Int. Cl.³ .............................................. B27J 5/00
[52] U.S. Cl. .................................................... 264/127
[58] Field of Search ......................................... 264/127

[56] References Cited

U.S. PATENT DOCUMENTS

| | | | |
|---|---|---|---|
| 2,456,621 | 12/1948 | Cheney, Jr. | 264/174 |
| 2,685,707 | 8/1954 | Llewellyn et al. | 264/174 |
| 2,847,711 | 8/1958 | Hibbard | 264/346 |
| 2,945,265 | 7/1960 | Sell, Jr. et al. | 264/176 P |
| 3,045,288 | 7/1962 | Sykora | 264/346 |
| 3,068,513 | 12/1962 | Chaffin | 264/176 R |
| 4,104,394 | 8/1978 | Okita | 264/127 |
| 4,203,938 | 5/1980 | Burnett et al. | 264/127 |

Primary Examiner—James R. Hall
Attorney, Agent, or Firm—R. B. Ingraham

[57] ABSTRACT

Tetrafluoroethylene polymer is downwardly extruded employing variable counterweight to provide tube of improved physical properties.

4 Claims, 3 Drawing Figures

U.S. Patent  Sep. 7, 1982  4,348,345
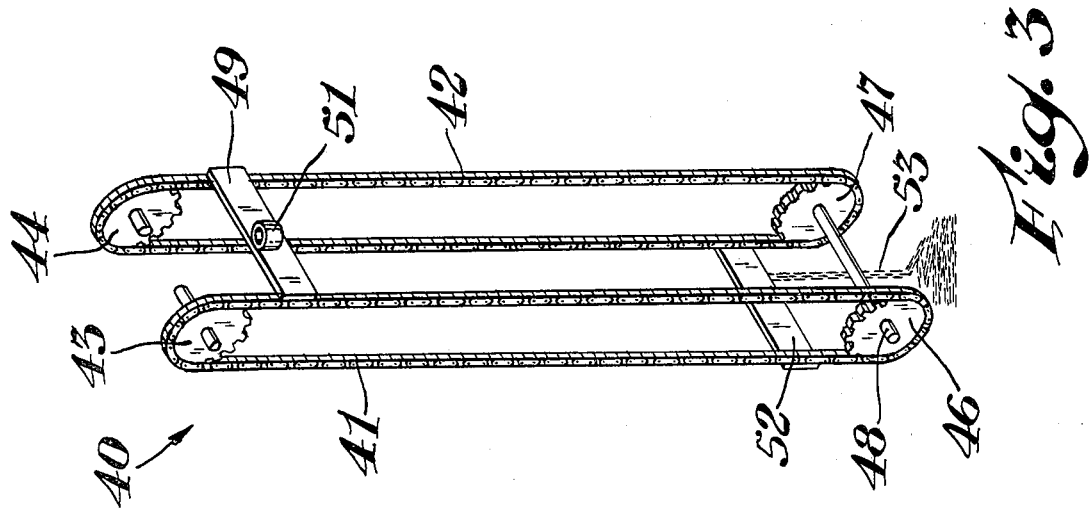
*Fig. 3*
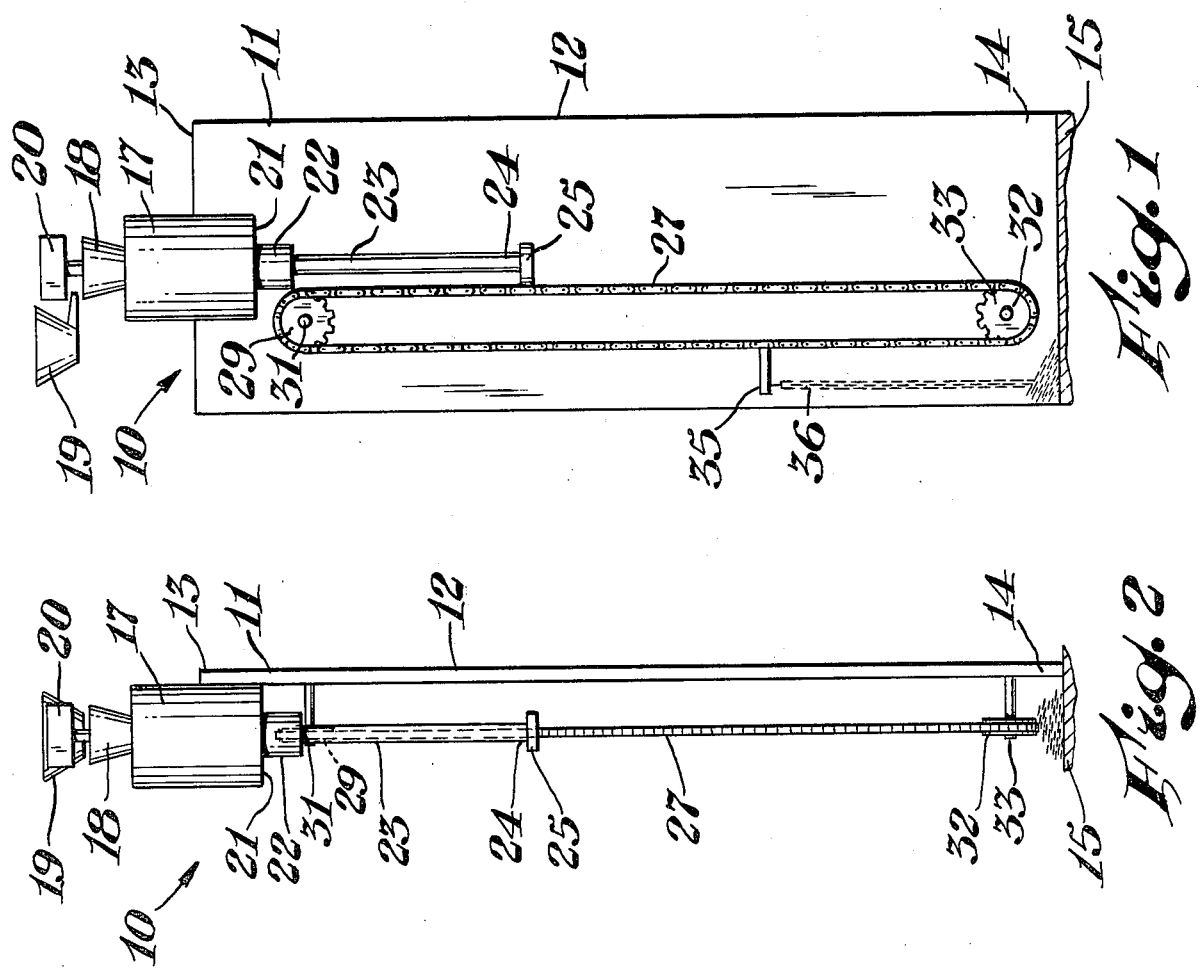
*Fig. 1*
*Fig. 2*

METHOD FOR THE TAKE-AWAY OF VERTICALLY EXTRUDED SYNTHETIC RESINOUS TUBES

Plastic lined pipe has found wide use in industry for applications where corrosion of conventional metallic pipes and conduit is undesirable. Plastic lined pipe or conduit provides a desirable combination of properties wherein the piping has the mechanical properties of the outer steel or other metal jacket and the desirable chemical resistance of the plastic liner. Plastic lined pipe does not provide a universal solution to all problems. Generally, lined pipe is less resistant to temperature cycling than is an all metal conduit. With plastic lined pipe, it has been known that liners have failed after temperature cycling, and cold flow of the liner can occur when flanged joints are employed. Oftentimes, plastic lined conduit is subject to corrosion due to the permeation of gases having a corrosive nature through the plastic liner. Generally, such plastic lined conduits vent the region between the liner and the supporting metallic conduit to space exterior to the conduit to prevent collapse of the liner due to the accumulation of gases which have permeated through the liner toward the interior wall of the supporting metallic conduit. By the judicious selection of appropriate plastic liner material and operating conditions, such difficulties are minimized.

A particularly desirable plastic lining for plastic lined conduit for extremes in both temperature and the corrosive nature of the material being handled are tetrafluoroethylene polymers such as polytetrafluoroethylene. Polytetrafluoroethylene, although softened by heating, is not readily fabricated by conventional thermoplastic process techniques but conventionally is fabricated using the processing techniques generally resembling the techniques employed for the preparation of sintered metal articles. Oftentimes, particularly in the preparation of tubular articles from tetrafluoroethylene polymer, such techniques result in articles having less than the desired physical properties. Various techniques are known for the preparation of tetrafluoroethylene polymer tubes. However, such techniques do not necessarily provide a tube having the desirable physical properties for the lining of metallic conduit. In general, for the lining of metallic conduit, the plastic tube such as a tetrafluoroethylene polymer tube should exhibit maximum density thereby providing a tube having minimal gas or vapor permeability. Such extruded tubes for optimum performance as a pipe or conduit liner should exhibit, on heating, minor shrinkage and preferably minor expansion in the radial direction and minimal shrinkage in the axial dimension. Shrinkage in the radial direction oftentimes results in a liner which will shrink within the lined conduit and, therefore, not be positively positioned within the conduit. In other words, the liner is loose. Generally, if the liner on temperature cycling exhibits a tendency to shrink in the axial direction and has integral flanges formed at the terminal portions of the liner, stress is generally concentrated at locations where the liner is flanged generally radially outward at either end of the conduit. Such stress can result in the phenomenon frequently referred to as stress cracking, that is rupture of the liner adjacent the thermal flange portions thereof which permits fluid being conveyed by the conduit ready access to the metallic outer jacket or conduit frequently referred to as failure.

A wide variety of techniques have been employed in the fabrication of tetrafluoroethylene polymers. One such method is set forth in our U.S. Pat. No. 4,203,938, issued May 20, 1980, wherein a polytetrafluoroethylene preform is formed from compacted polytetrafluoroethylene over a mandrel and the preform removed from the mandrel and sintered to provide a tube suitable for conduit lining.

Other processes for the preparation of tetrafluoroethylene polymer bodies are disclosed in U.S. Pat. No. 2,456,621 (Cheney, Jr.) wherein particulate polytetrafluoroethylene is pre-baked at a temperature from about 300° to 500° C. and subsequently extruded in a ram extruder to provide rods, tubes or coated wire.

U.S. Pat. No. 2,685,707 (Llewellyn et al.) discloses the preparation of extruded polytetrafluoroethylene by admixing the tetrafluoroethylene polymer with about 5 to 50 weight percent of an organic liquid and subsequently sintering the preform obtained by extrusion.

U.S. Pat. No. 2,847,711 (Hibbard) discloses the fabrication of polytetrafluoroethylene by, in essence, compacting polytetrafluoroethylene powder into a preform, for example, by compression molding, subsequently heating the preform in a second mold to a temperature above about 620° F. (about 327° C.) to obtain a desired tetrafluoroethylene polymer article.

U.S. Pat. No. 2,945,265 (Sell, Jr. et al.) discloses a method for the preparation of insulated wire wherein a ram extruder extrudes a mixture of tetrafluoroethylene polymer and a volatile organic material over a wire. The volatile organic material is removed by heating and the residual tetrafluoroethylene is sintered on the wire in a sintering oven.

U.S. Pat. No. 3,045,288 (Sykora) discloses that formed polytetrafluoroethylene articles may be annealed by maintaining the article just below a gel temperature of 617° F. (325° C.) for a period sufficiently long to stabilize the dimensional changes and subsequently cooling the article to room temperature.

U.S. Pat. No. 3,068,513 (Chaffin) discloses the ram extrusion of a polytetrafluoroethylene sheet wherein a plurality of temperature control zones are employed. Rod stock may also be prepared using this technique.

U.S. Pat. No. 3,456,294 (Hood et al.) discloses an apparatus for downward extrusion of thin walled polytetrafluoroethylene tubing.

U.S. Pat. No. 4,104,394 (Okita) discloses a heat shrink polytetrafluoroethylene polymer tube prepared by extrusion. The tube is subsequently heated, inflated and cooled in the inflated condition.

In the publication "Research Disclosure" of January 1978, entry number 16508, it is disclosed that various fluorocarbon resins such as TEFLON FEP and PFA fluorocarbon resins may be extruded using relatively high temperatures at the die to result in decreased melt fracture. The term "TEFLON" is a trade designation for polytetrafluoroethylene. FEP is generally regarded as an abbreviation for fluorinated ethylene-propylene copolymers and PFA is an abbreviation for perfluoroalkoxy polymers.

The problem of tube extrusion is described in great detail in the ICI Technical Service note F2, Third edition, concerning "FLUON" polytetrafluoroethylene by the Molding Powders Group ICI Plastics Division, Welwyn Garden City, Herts, England; published July 1974. The ICI publication, page 6 thereof, discloses that polytetrafluoroethylene desirably may be extruded in an extruder having four heating zones, each separately controlled and having temperatures of 370° C. (inlet), 400° C., 400° C. and 350° C. (outlet). A similar disclosure is set forth on pages 8, 9 and 11. A desirable arrangement of a ram extruder is set forth on page 19 wherein a generally downwardly extending ram tube extruder is disclosed and four heating zones are employed. On page 24, Table 11, the publication sets forth that desirable extrusion temperature for 60 to 50 millimeter diameter tubing is 380° C., 400° C., 400° C. and 300° C., respectively, as the extrusion progresses.

It has been found desirable to extrude the polytetrafluoroethylene at a temperature above its crystalline melting point into a chamber wherein the temperature is reduced to below the crystalline melting point. In such a procedure, the tube has been supported by a continuous take-away device which has provided a high quality tube except for the appearance of annular rings or bamboo-like effect due to the intermittent action of the extruder and the continuous action of the take-away.

It would be desirable if there were available an improved method for the preparation of polytetrafluoroethylene polymer tubes.

It would also be desirable if there were available an improved method for the preparation of tetrafluoroethylene polymer tubes exhibiting minimal wall irregularities and uniform diameter.

It would also be desirable if there were available an improved method for the preparation of tetrafluoroethylene polymer tubing employing a relatively simple and easily adjustable apparatus.

These benefits and other advantages in accordance with the present invention are achieved in a method for the fabrication of tetrafluoroethylene polymer tubes or articles wherein tetrafluoroethylene polymer resins are downwardly ram extruded in a ram extruder to generally fuse together the polytetrafluoroethylene particles to provide a coherent tetrafluoroethylene polymer tube from a ram extruder and subsequently cooling the tetrafluoroethylene polymer tube to a self supporting condition, the tetrafluoroethylene polymer tube being discharged from the extruder at a temperature above its crystalline melting point, cooling the tube below its crystalline melting point while the tube is radially unsupported and axially supported to provide a tetrafluoroethylene polymer tube of desirable physical properties, the improvement which comprises supporting the tetrafluoroethylene polymer tube on a movable counterbalanced support means which permits downward motion of the tetrafluoroethylene polymer tube without inducing significant stress either on a continuous or incremental basis to the portion of the tube which is above the crylstalline melting point and external to the ram extruder.

Also disclosed for carrying out the method invention is an apparatus for the downward extrusion of tetrafluoroethylene polymer into tubular articles, the apparatus comprising in cooperative combination a vertically downwardly extending ram extruder having an extrusion die, a chamber disposed external and downwardly from the die of said extruder to permit the passage of an extruded tube out and through and retard the cooling thereof below the crystalline melting point, the improvement which comprises a tube support means movably supported beneath the extruder, the support means being generally upwardly and downwardly movable along the axis of extrusion, the support means supporting the extruded tube in such a manner that no significant elongation or shortening of the extruded tube occurs in a region of the tube external to the extrusion die, the support means having affixed thereto a variable counterweight means to increase the weight thereof as tubing is extruded.

Further features and advantages of the present invention will become more apparent from the following specification taken in connection with the drawing wherein FIG. 1 is a schematic plan view of an apparatus used in the invention.

FIG. 2 is a schematic end view of the apparatus of FIG. 1.

FIG. 3 depicts an alternative tube support arrangement to that depicted in FIGS. 1 and 2.

In FIGS. 1 and 2 there is schematically depicted an apparatus in accordance with the present invention generally designated by the reference numeral 10. The apparatus 10 is particularly suited for the practice of the method of the present invention.

The apparatus 10 comprises in cooperative combination a frame 11. The frame 11 has a first end 12, a top 13 and a bottom 14. The bottom 14 is supported by a base 15 shown only in part. A downwardly extruding ram extruder 17 is affixed to the first or upper end 13 of the base 11. The ram extruder has an upwardly facing distribution hopper 18 and a feed hopper 19, feeding granular tetrafluoroethylene polymer to the distribution hopper 18. A ram and optionally mandrel actuating means 20 is disposed above the distribution hopper 18. The ram extruder 17 is adapted to extrude tetrafluoroethylene polymer. The ram extruder 17 has a discharge end 21 which had affixed thereto a hollow generally cylindrical heating chamber in which an extruded tetrafluoroethylene polymer tube 23 cools from a temperature above the crystalline melting point to a temperature below the crystalline melting point. The tube 23 extrudes downwardly and has a terminal end 24 remotely disposed from the extruder 17. The tubing end 24 is axially supported by a support means or tube engaging support 25. The support 25 is affixed to a flexible endless member 27. The member 27 advantageously may be flexible cable, metal band, ladder chain, roller chain or the like. Initially, roller chain appears to be preferrable. The member 27 passes over a first or upper rotary support 29, pivotally affixed to base 11 by shaft 31. Advantageously, the support 29 is a pulley, sprocket or other appropriate support depending upon the variety of construction of the flexible element 27. Remotely disposed from the rotary support 29 is a second rotary support 32 disposed adjacent the second end 14 of the frame 11 and rotating in a plane which is generally coplanar with the plane of rotation of support 29. The rotary support 32 is pivotally affixed to the base 11 by means of shaft or support 33. Generally remotely disposed from the support 25 is a counterweight attaching member 35. The member 35 has affixed thereto variable counterweight 36 which advantageously is a freely rotating coupled link member such as machine chain, straight link chain, twist link chain, twist link weld chain as well as many other varieties of weldless chain of single or double loop construction.

In operation of the apparatus as depicted in FIGS. 1 and 2, tubing such as tubing 23 is extruded intermittently from the ram extruder 17. The extruded end 24 of the tubing 23 contacts the support 25 and as the tubing is forced out of the extruder, the support 25 is forced from a location adjacent the chamber 22 on the extruder 17 to a location toward the bottom 14 of the frame 11.

As the support 25 moves downwardly, the connector 35 moves upwardly carrying with it and increasing the quantity of chain, the chain or variable counterweight being selected to weigh approximately the same amount as does an equally long unit of the extruded tube. For example, if the extruded tube would weigh about one pound per lineal foot, the variable counterweight in the form of a chain would be selected to weigh about one pound per lineal foot.

Ideally, the bearings upon which the rotary supports 29 and 32 rotate should be frictionless as should the flexible member 27. However, for practical purposes, highly desirable uniform tubes are obtained when conventional ball bearings and roller chain are employed. FIG. 3 schematically depicts an alternative embodiment of support and variable counterweight which is particularly desirable if a chamber such as chamber 22 might interfere with a single flexible member such as the flexible member 27 of FIG. 1. The assembly of FIG. 3 generally designated by the reference numeral 40 comprises first and second flexible endless members 41 and 42 arranged in parallel vertically disposed loops. Member 41 passes over an upper rotary support 43 pivotally affixed to a base not shown, and member 42 passes over pivotally supported member 44 disposed generally co-axially with and parallel to member 43. The bottom portions of the loop formed by member 41 pass over a first pulley or gear 46 whereas the lower end of the loop formed by the member 42 passes over a pulley or gear 47. Pulley or gear 47 is rigidly affixed to a common shaft 48 to position the two members 41 and 42 generally parallel.

As depicted in FIG. 3 a first connector 49 such as a plate is affixed to both flexible members 41 and 42. As depicted in FIG. 3, the connector 49 extends generally parallel to the shaft 48 and is disposed toward the viewer. The connector 49 has affixed thereto a tubing support member 51 adapted to engage the emerging end of an extruded tubular member. A second connector 52 such as a plate is disposed remote, that is about 180°, from connector 49 on the loops of the members 41 and 42. Connector 52 is rigidly affixed to the flexible members 41 and 42. Variable counterweight 53 as depicted in FIG. 3 is affixed to the plate or connector 52 and is disposed remote from the viewer as shown in FIG. 3.

The embodiment of the variable counterweight and support member as depicted in FIG. 3 provides some advantage in having increased rigidity of the support and in employing lighter components.

By way of further illustration, the tetrafluoroethylene polymer under like conditions with and without an apparatus generally as depicted in FIG. 1 and employing the support of FIG. 2, two-inch tubing extruded to a 20 foot length which weighed 12.5 ounces per foot had a diameter of 2.150 inches at the beginning of extrusion and a diameter of 2.150 inches when the 20 foot length was cut from the still being extruded tube. The counterweight employed was ¼ inch weld link chain weighing about 11.6 ounces per foot. No bamboo-like effect was observed, that is, a ring-like appearance circumferentially above the tube at short intervals.

Without the chain and benefit of the support, additional material extruded had a diameter of 2.053 inches and after 20 foot tube had been extruded, the diameter was reduced to 1.996 inches.

A similar experiment was conducted to 3-inch tubing and 10 foot lengths were extruded. The extruded tube weighed about 1.34 pounds per lineal foot. The counterweight employed was 5/6 inch chain plus one piece of No. 1 single loop twisted chain to provide a total chain weight per foot of 1.23 pounds per lineal foot. The initial extruded diameter of the 10 foot length of 3 inch tube, using the chain counterweight was 3.245 inches, and after 10 feet had been extruded, the diameter was reduced to 3.242 inches. Without the chain and benefit of the support and counterweight, the initial diameter was 3.211 inches and the diameter after 10 feet had been extruded was 3.145 inches. Neither with nor without the chain was the bamboo-like effect observed.

The basic techniques of extrusion of tetrafluoroethylene polymer tubes are well known as indicated by at least some of the references cited herein; the teachings of all of the references are herewith incorporated by reference thereto.

In the manner of the foregoing illustrations, other tetrafluoroethylene polymers are readily extruded in rod and tube form employing the practices hereinbefore set forth.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a method for the fabrication of a tetrafluoroethylene polymer tube wherein tetrafluoroethylene polymer resins are downwardly ram extruded in a ram extruder to heat and generally fuse together the polytetrafluoroethylene particles to provide a coherent tetrafluoroethylene polymer tube from the ram extruder, subsequently cooling the tetrafluoroethylene polymer tube to a self supporting condition, the tetrafluoroethylene polymer tube being discharged from the extruder at a temperature above its crystalline melting point, cooling the tube below its crystalline melting point while the tube is radially unsupported and axially supported to provide a tetrafluoroethylene polymer tube of reduced gas permeability, the improvement which comprises supporting the tetrafluoroethylene polymer tube on a movable counterbalanced support means which permits downward motion of the tetrafluoroethylene polymer tube without inducing deformation of the tube either on a continuous or incremental basis to the portion of the tube which is above the crystalline melting point and external to the ram extruder.

2. The method of claim 1, wherein the tube is extruded intermittently.

3. The method of claim 1, wherein the movable counterbalance support means comprises an endless flexible member having affixed thereto a tube engaging means and remotely disposed from the tube engaging means a variable weight counterweight to thereby provide a tube of generally constant diameter.

4. The method of claim 3, wherein the counterweight is a chain whose weight per unit length approximates that of the extruded tube.

* * * * *